United States Patent [19]

Takahashi et al.

[11] 4,164,956

[45] Aug. 21, 1979

[54] SWITCHING VALVES

[75] Inventors: Akio Takahashi, Yokohama; Hirokichi Saito, Shimizu, both of Japan

[73] Assignee: Ihara Chemical Industry Co. Ltd., Tokyo, Japan

[21] Appl. No.: 770,932

[22] Filed: Feb. 22, 1977

[30] Foreign Application Priority Data

Feb. 20, 1976 [JP] Japan .................................. 51/16922
Apr. 19, 1976 [JP] Japan .................................. 51/48952
Aug. 5, 1976 [JP] Japan .................................. 51/104062

[51] Int. Cl.² .................... F16K 11/07; F16K 11/085
[52] U.S. Cl. .............................. 137/242; 137/625.46; 425/562
[58] Field of Search ................... 137/625.23, 625.22, 137/625.69, 242, 625.46; 425/562

[56] References Cited

U.S. PATENT DOCUMENTS

| 294,216 | 2/1884 | Fletcher | 137/625.22 |
| 525,462 | 9/1894 | Jones | 137/625.69 |
| 579,432 | 3/1897 | Harrison | 137/625.23 |
| 911,858 | 2/1909 | Watters | 137/625.23 |
| 2,182,459 | 12/1939 | Vickers | 137/625.23 |
| 2,822,821 | 2/1958 | Gordon | 137/625.23 |

Primary Examiner—Arnold Rosenthal
Attorney, Agent, or Firm—Tab T. Thein

[57] ABSTRACT

Switching valves, e.g. for a closed-type molding apparatus for manufacturing polyurethane elastomers and the like, comprising a valve body having a plurality of openings, preferably five, serving as inlet and outlet ports, and a preferably rotatable valve sleeve which serves for switching the openings without any danger of introducing any other material into the switching valve system. Connections are made between pairs of adjacent openings, one of them being cut off from communication.

1 Claim, 11 Drawing Figures

SWITCHING VALVES

The present invention relates to switching valves utilized, for example, in an apparatus for manufacturing polyurethane elastomers and the like.

To assist in understanding the present invention, the two-component one-shot method will be briefly described hereinafter, one of the well known methods for manufacturing such elastomers. This particular method consists in a combination of steps of preparing a mixture of a polyester (or polyether) and an activator, supplying a predetermined volume of the mixture and a predetermined volume of isocyanate from respective containers to a mixer chamber with the aid of respective metering pumps, while carrying out a continuous measurement of the supplied liquids, and continuously discharging the final mixture through a nozzle in the mixer chamber into a molding die.

Due to the bulk and the quantity of the required molded products, however, the molding operation often takes place with the use of a switching valve which is operated intermittently. Once charging into the mold has been completed, the mixture starts solidification also in the mixer chamber. To avoid this, it is required to flush the interior of the chamber with a solvent every time when the charging operation is completed, and then blow away with air any residual material possibly adhering to the inner wall of the chamber. Such a flushing operation, using solvent and air, however, causes an undesirable contamination in the working environment, considerable loss of supply material at the starting time of the mixing operation, fluctuation of the preparation ratio of the components, and other drawbacks.

In view of the above-described drawbacks in the conventional method for manufacturing such elastomers, the principal object of the present invention is to provide switching valves for apparatus for manufacturing polyurethane elastomers and the like, capable of switching the flow of a plurality of liquids, as required, without any intermittence of the streaming thereof.

Another object of the invention is to provide a switching valve capable of continuously switching the fluid streams without any inclusion of other materials.

Yet another object is to provide a switching valve with which it is possible to remove solidified material from the outlet port of the switching valve if solidification should take place.

Still another object of the present invention is to provide a switching valve which is simple to manufacture.

The present invention resides essentially in that the switching valve comprises a valve member or sleeve having (n) openings in an odd number and a switching member slidably or rotatably arranged relative to the former and having communicating grooves, each of which is adapted to make connection between two pairs of adjacent openings, while the remaining one opening is not in communication with any of the grooves and is ready to be switched.

In a preferred embodiment, the invention relates to a switching valve for a closed-type molding apparatus, comprising a valve sleeve with five regular and one additional openings, and a switching member rotatable relative to the sleeve and having therein two regular and one additional grooves, capable of linking adjacent pairs of the regular openings, and the additional opening to one of the regular openings. A knock-out rod allows solidified material to be removed from the valve when passed into and through the additional groove and the respective openings.

It might be added at this point that the present invention is closely related to another application, filed concurrently herewith, of the same inventor, titled "Mixing Apparatus", Ser. No. 770,933, having several common details, and supplementing each other to some extent although no specific references will be made herein. This application is now U.S. Pat. No. 4,106,115 dated Aug. 8, 1978.

Other objects, advantages and features of the present invention will become better understood by way of the following detailed description, when considered in conjunction with the accompanying drawings, wherein FIG. 1 is a sectional view of a first exemplary embodiment of a rotary switching valve according to the present invention;

Figure 1:
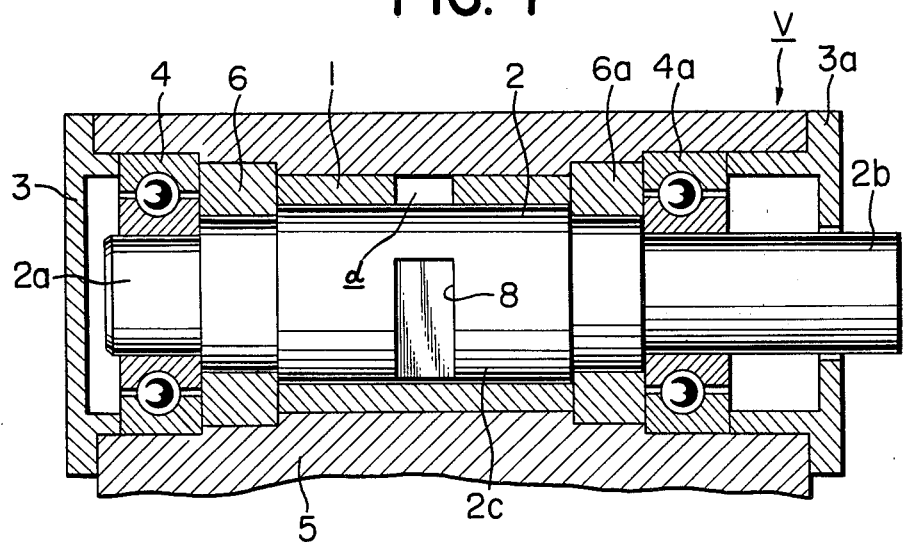
Figure 2:
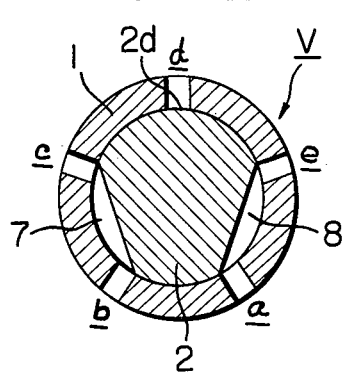
FIG. 2 is a cross-sectional view of the valve shown in FIG. 1.

Referring now to FIGS. 1 and 2, a cylindrical valve sleeve 1 constituting the outer housing of a first exemplary switching valve V is provided with (n) through openings (in this case, preferably n=5) a . . . e at equal angular distances on the periphery thereof, wherein the number (n) is odd. In the interior of valve sleeve 1 there is inserted a valve stem 2 as a switching member, the ends 2a, 2b of reduced diameter of member 2 being rotatably supported by means of ball bearings 4, 4a in a main frame 5 retained by a seal cover 3, 3a. The inner surface of sleeve 1 is in slidable contact with the outer surface of an enlarged portion 2c of stem 2. Numerals 6, 6a denote respective oil seals.

On stem 2 there are provided non-communicating grooves 7, 8, of which the width is almost equal to the diameter of openings a . . . e (compare opening d with groove 8 in FIG. 1), with a total of four end ports. The length of grooves 7, 8 is such that two adjacent pairs of five openings a . . . e are always in communication through grooves 7, 8. For instance, openings a and e are interconnected through groove 8, while b and c through groove 7, in the position as shown in FIG. 2. A remaining peripheral portion 2d (FIG. 2) of valve stem 2 serves to close the fifth opening d. The latter is consequently in no communication with any other opening.

Figure 3:
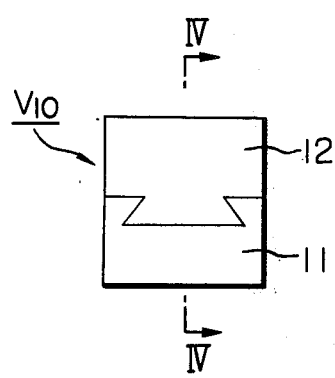
FIG. 3 is a side view of a slidable switching valve according to a second embodiment.
Figure 4:
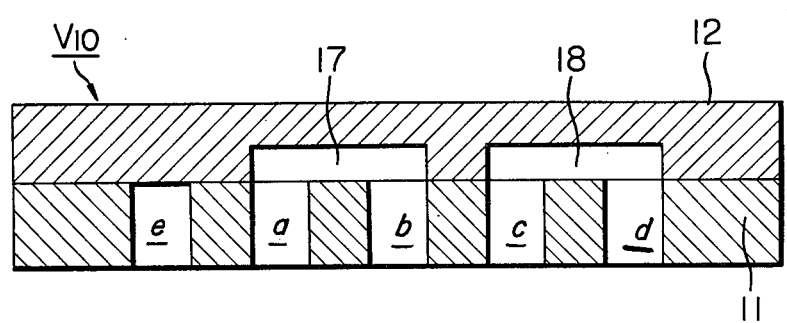
FIG. 4 is a sectional view of the valve taken in line IV—IV of FIG. 3.
Figure 5:
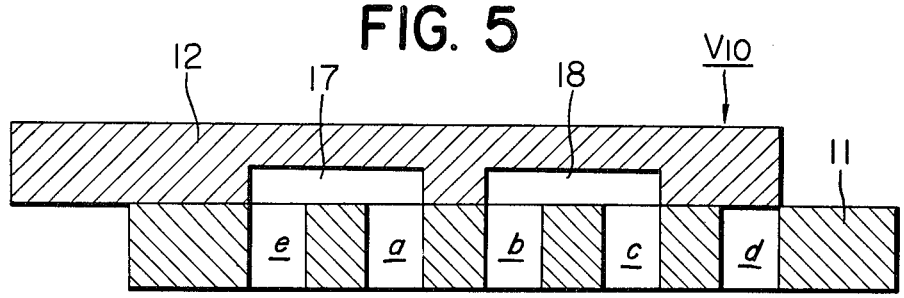
FIG. 5 is a similar sectional view of the valve of FIGS. 3, 4 in one operative position.

Referring next to FIGS. 3 to 5, a second slidable embodiment of the present invention is described. In FIG. 3 a switching valve V10 comprises a valve member 11 and a valve stem 12, the latter being slidably arranged over member 11 with the aid of a dove-tail groove. As shown in FIG. 4, member 11 is again provided with five openings a . . . e at equal distances therebetween. On the other hand, stem 12 has two grooves 17, 18 through which four adjacent openings a . . . d are connected in pairs by way of a combination of two of the five openings, for instance, openings a, b as well as c, d. When valve stem 12 is displaced to the left, sliding over valve member 11, opening e which so far was not in communication comes to be linked to opening a, causing opening d to be out of communication with any other opening, as shown in FIG. 5. The arrangements of the further embodiments to be described hereinafter are substantially the same in regard to the openings in the respective sleeves or members, and to the groove end ports in the corresponding switching members.

Figure 6:
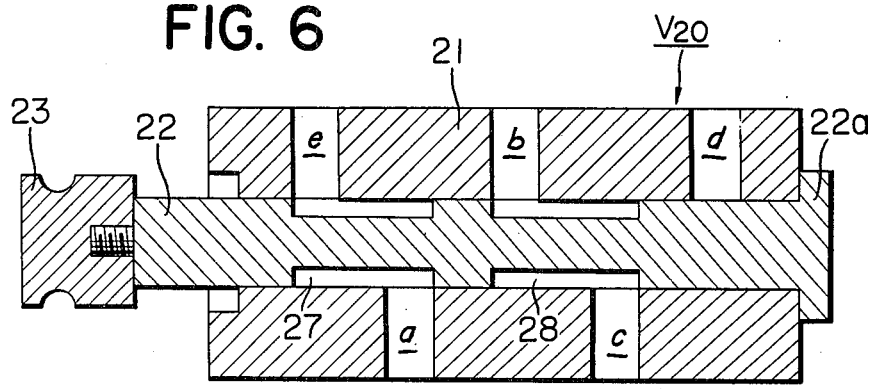
FIG. 6 is a sectional view of a third slidable embodiment of the switching valve according to the invention.
Figure 7:
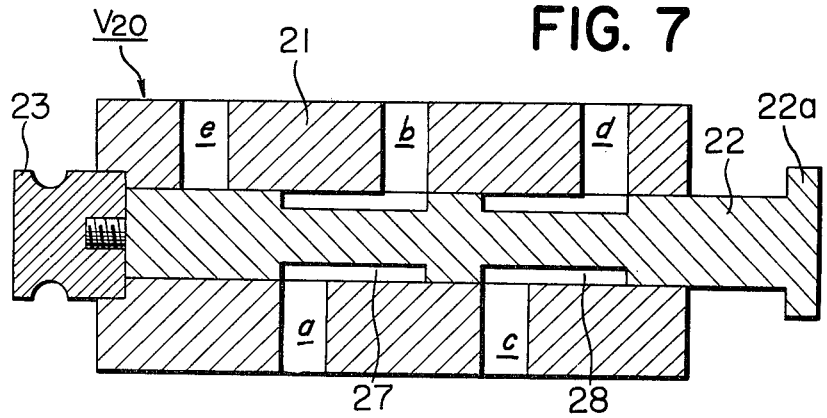
FIG. 7 is a sectional view of the valve of FIG. 6 in one operative position.

Further a third, again slidable embodiment of the invention is described with reference to FIGS. 6 and 7. A valve member 21 constituting the outer housing of a switching valve V20 in the form of a cylinder is provided with five through openings a . . . e. In the inner cavity of member 21 there is inserted a valve stem 22 as a switching member, slidably arranged over member 21 in close contact therewith. On the outer periphery of valve stem 22, around its middle part, there are provided two annular communicating recesses or grooves 27, 28. The axial lengths of the grooves are such that four adjacent openings among the five are connected to each other by way of a combination of two openings, for instance, openings e and a, as well as b and c, in the case of FIG. 6. The remaining opening d is kept closed and out of communication with any other opening.

At the extreme end of stem 22, at the right, there is provided a stop 22a which is integral with the valve stem, serving to limit the range in which the valve stem is capable of sliding, while at the other end thereof there is provided a grip 23 connected to stem 22 by way of a screw or the like. As grip 23 is pushed to the right, valve stem 22 is moved, sliding along the inner wall of valve member 21, so that opening e is shut while other openings a . . . d communicate with each other by the communication of two pairs of adjacent openings, that is a, b as well as c, d as shown in FIG. 7.

Further a preferred fourth, rotary embodiment of the invention is now described with reference to FIG. 8. A valve stem 32 of this valve V30 is provided with a radial slit, passage or additional groove 33 which extends through the center thereof, for purposes to be explained later, while a valve sleeve 31 is provided with a supernumerary through opening f in addition to openings a . . . e, openings e, f being aligned with radial slit 33.

Figure 8:
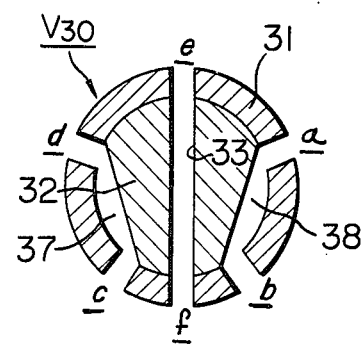
FIG. 8 is a cross-sectional view of a fourth, preferred, rotary switching valve embodiment of the invention.

It should be understood that all exemplary embodiments have valve members or sleeves with five openings (only FIG. 8 has the additional opening f therein). They cooperate with the two separate, non-communicating grooves in the switching members (except for FIG. 8 that has an additional groove or passage 33 to provide a third interconnection among the total of six end ports). When the valves are operated, in all embodiments except FIG. 8, one of the five openings is cut off entirely from communication, but in FIG. 8 all openings, ports and grooves are interconnected in pairs.

Now that typical, exemplary embodiments V, V10, V20, V30 of the switching valve according to the present invention have been described, an application of some of the rotary valves to the manufacturing of polyurethane elastomers will be described with reference to FIG. 9 in which three valves V1, V2, V3 are utilized, as shown in FIGS. 1, 2 at V.

Numeral 41 denotes in FIG. 9 a reservoir tank for a mixture (hereinafter referred to as liquid A) e.g. of polytetramethylene ether glycol with 4,4'-diamino-2,3,2',3'-tetrachlorodiphenylmethane, and numeral 42 denotes a similar tank for a mixture (hereinafter referred to as liquid B) of 80% of 2,4-tolylene-diisocyanate and 20% of 2,6-tolylene-diisocyanate. Reservoir tanks 41, 42 are connected to respective inlets a of switching valves V1, V2 via metering pumps 43, 44, through suitable connecting pipes. Outlets b of these valves are both connected to a mixer chamber 45, and the outlet of the chamber is connected to inlet a of switching valve V3. Outlet e (a nozzle) of valve V3 is connected to a mixture receptacle, for instance, a molding die 46. On the other hand, solvents as detergents S (for instance, polypropylene glycol) are stored in another reservoir tank 47 which is connected to inlet c of valve V3 via a pump 48. Outlet d of valve V3 is connected to both inlets c of valves V1, V2. Further, outlets d of valves V1, V2 as well as outlet b of valve V3 all lead to tank 47, while outlets e of valves V1, V2 are connected to respective tanks 41, 42, as shown.

Next the operation and the features of the switching valves V1 . . . V3 are clarified together with a description of the manufacture of polyurethane elastomers.

In a steady state, in a first stage, that is, before mixing liquids A, B, openings a, e and c, b of respective valves V1, V2 are brought into communication while openings a, b and c, d of valve V3 are also in communication, as shown.

Owing to this arrangement, there is formed for liquids A, B a respective cycling line from pumps 43, 44 through openings a, e in valves V1, V2 to respective tanks 41, 42. As to detergent S another cycling line is formed from pump 48 through openings c, d in valve V3, through openings c, b in both valves V1, V2, through mixer chamber 45, and then through openings a, b in valve V3 to tank 47.

Next, in a second stage, valves V1, V2 are switched over to make communication between openings a, b as well as c, d a short time after liquids A, B start to be mixed. This causes the liquids to pass through opening a, b in valves V1, V2, to be mixed in chamber 45 (they are in an unstable mixing because chamber 45 is still filled with detergent S), then to flow into tank 47 through openings a, b of valve V3. On the other hand, detergent S passes from pump 48 through openings c, d in valve V3 and then through openings c, d in valves V1, V2, to return to tank 47.

Now molding starts once it is recognized that the mixing state of liquids A, B gets stable. This requires only valve V3 to be switched so that openings a, e and c, d of valves V1, V2 are in communication the opposite of what is illustrated. As a result, the mixture in chamber 45 passes through openings a, e in valve V3 into die 46, to be molded therein. At this moment detergent S flows back to tank 47 through openings c, b in valve V3.

Finally, in a third stage, valve V3 is switched over to make communication again between openings a, b as well as c, d, as the mixing of liquids A, B comes to completion. This allows the mixture of liquids A, B to flow through openings a, b in valve V3 to tank 47 for the detergent, while the latter passes through openings c, d in valve V3 and then through openings c, d in valves V1, V2, to flow back to reservoir 47.

Then, as valves V1, V2 are switched over to make communication, both between openings a, e and c, b, cycling lines are formed for liquids A, B, respectively, in which the liquids pass through openings a, e in valves V1, V2 and flow back to respective tanks 41, 42.

Detergent S passes through openings c, d in valve V3 and through openings c, b in valves V1, V2, flows into chamber 45 to clean the same, and further passes through openings a, b in valve V3, to flow back to tank 47. Of course valves V1, V2 may be switched over at the same time as valve V3 is switched over.

As the third stage is over, the initial steady state of the first stage is restored. The above steps of operation are again repeated by refilling liquids A, B.

As will be obvious from the above description, switching valves V1 ... V3 are provided each with two inlets and three outlets, respectively, one of the outlets (openings b in valves V1, V2 and V3) being a common outlet to the two inlets.

Figure 9:
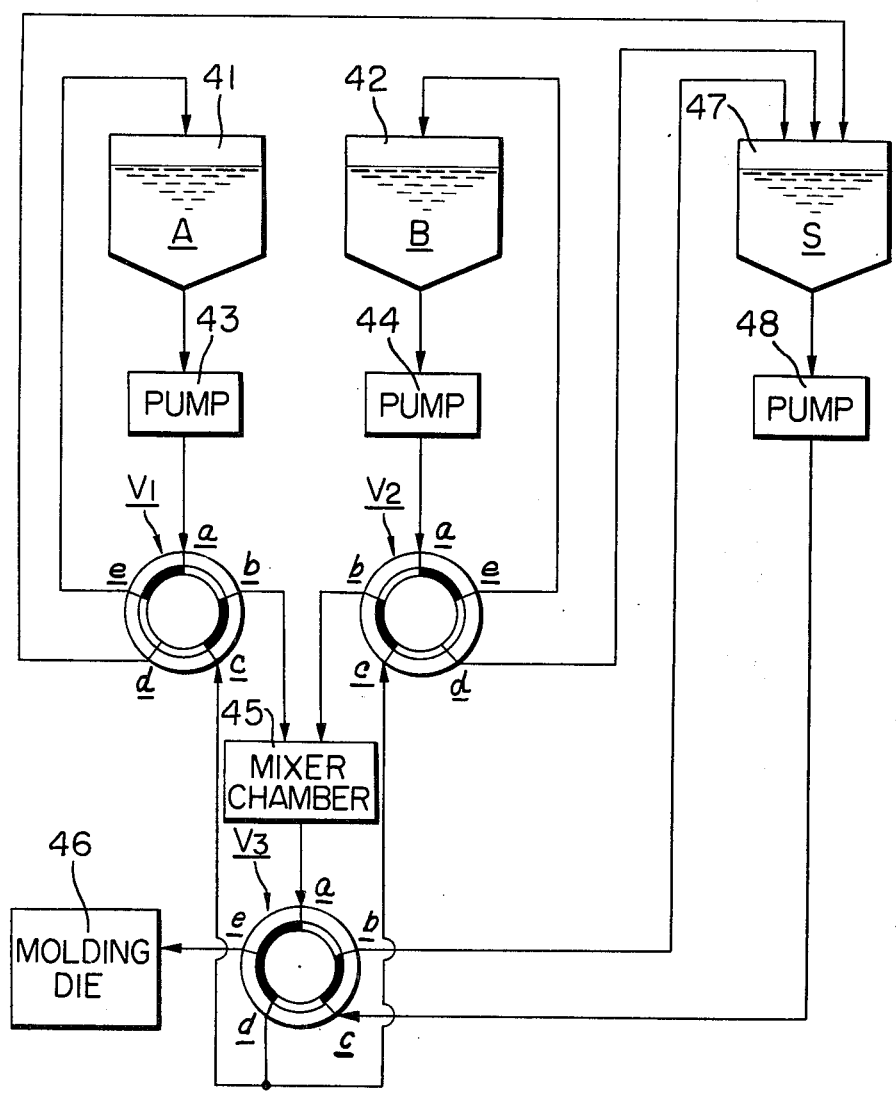
FIG. 9 is a flow sheet for a molding apparatus to which rotary switching valves according to the present invention are applied.

As further seen in FIG. 9, outlet e of valve V3 is in communication with molding die 46 but no passage is provided through which detergent S is delivered to outlet e of valve V3 and die 46. Especially in the case that valve V3 is situated below molding die 46, this valve being constructed such that liquids A, B are fed to die 46 in the upward direction, they tend to be solidified in outlet e of valve V3, resulting in a clogging with the solidified liquids in the piping or conduits. To eliminate this trouble with switching valve V3, it is proposed according to the present invention that switching valve V30 be utilized in place of valve V3, the former as illustrated in FIG. 8.

Figure 10:
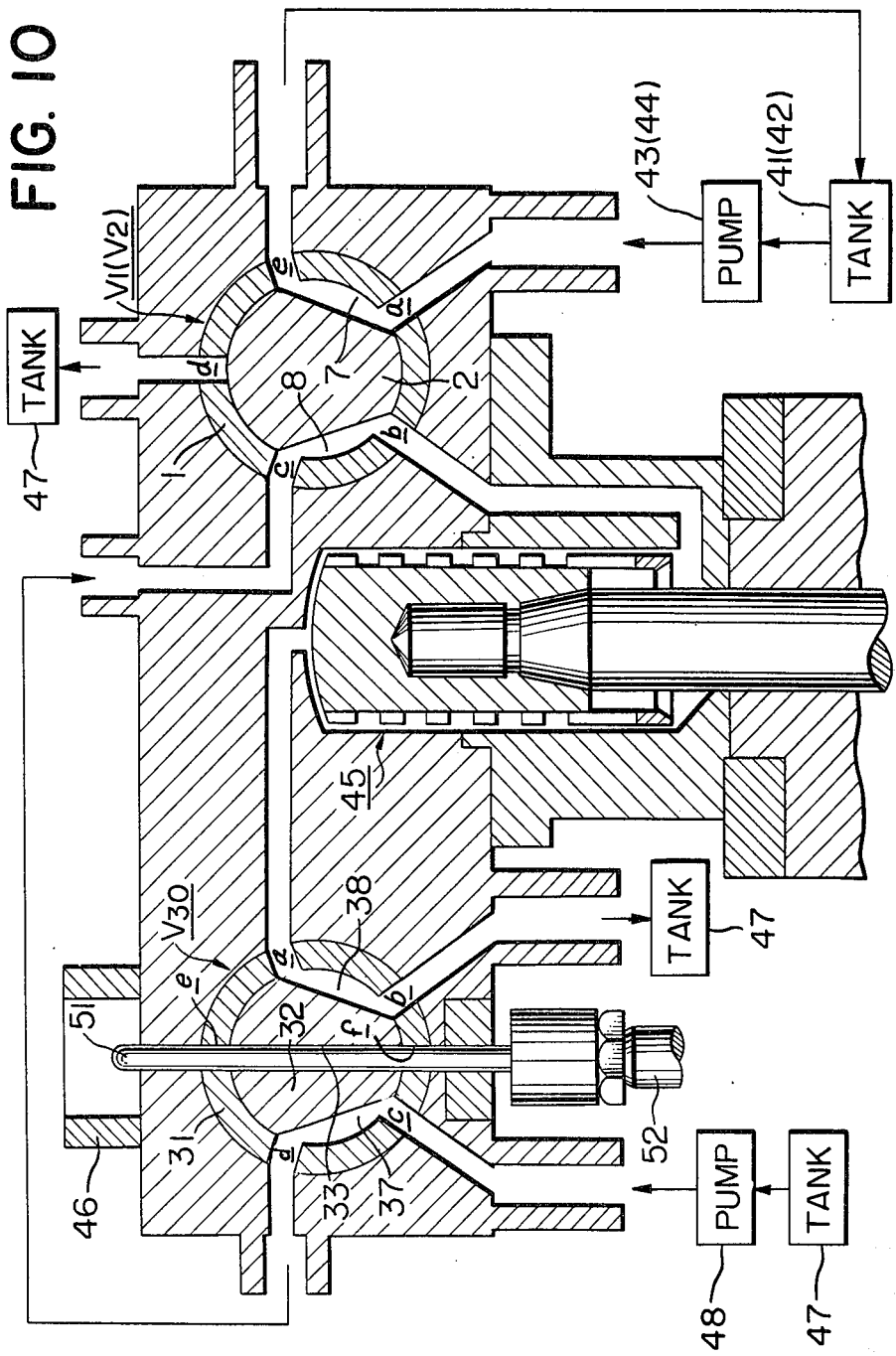
FIG. 10 is a sectional view of a molding apparatus in which the inventive rotary switching valves are mounted.
Figure 11:
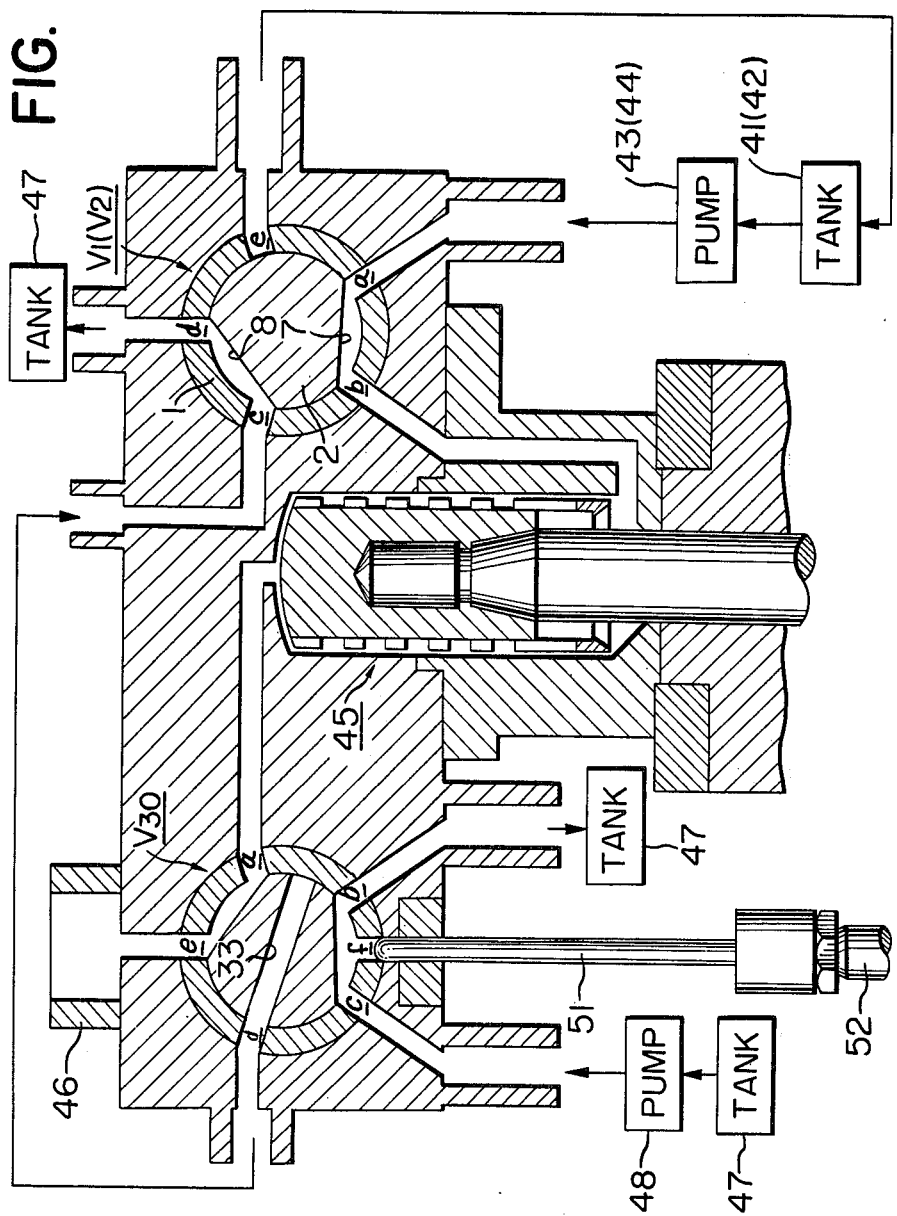
FIG. 11 is a similar sectional view of the molding apparatus of FIG. 10 in a particular operative position.

Referring now to FIGS. 10 and 11, switching valve V30 (of FIG. 8) is insertable into and constructed such that a knock-out rod 51 is displaceable within openings e, f in valve sleeve 31 and passage 33 therebetween in valve stem 32, in the upright direction, as shown in FIG. 10. The latter illustrates an arrangement of valves V1 and V30 in a steady state, in the first stage, while FIG. 11 relates to the time of injection molding.

When it is found that the mixture is solidified in opening e of valve V30 and within molding die 46 at the start of the operation, before the steady state in the first stage, knock-out rod 51 is driven by means of a ram 52 of a hydraulic cylinder or the like to extend through opening f, passage 33 in valve stem 32, and port e, all in valve V30, into the interior of die 46. As a result the solidified block of the mixture is easily removed out of die 46. It will be clear from the lower portion of FIG. 9 and from the respective position of the ram 52 in FIGS. 10 and 11 that port e serves as the outlet of valve V30 to feed the molding die 46.

It will be understood by those skilled in the art that modifications, additions, changes, substitutions and the like can be made in the described, exemplary embodiments, within the known concept of mechanical and operational equivalents, without departing from the spirit and scope of the present invention.

What we claim is:

1. A switching valve for a closed-type molding apparatus, comprising a valve sleeve (31) having therein five regular openings (a ... e), and a switching member (32) rotatable relative to said sleeve and having two separate, non-communicating regular grooves (37, 38) formed therein; wherein said sleeve is cylindrical, and said switching member is in the form of a valve stem lodged within said sleeve and has said regular grooves in a substantially diametral arrangement therein; wherein said regular openings consist of two inlets (a, c) and three outlets (b, d, e), said inlets and said outlets alternating in their sequential arrangement with respect to said sleeve at substantially equal angular distances; one (b) of said outlets, between said two inlets, being a common outlet for those inlets; said two grooves having a total of four end ports for selectively making connection between pairs of adjacent ones of said regular openings, namely between an inlet and an outlet; and wherein said sleeve has therein an additional opening (f) diametrally aligned with another one (e) of said regular openings, and further wherein said switching member has therein an additional groove (33) that is capable of linking said additional opening to said other opening; and a knock-out rod (51) removably insertable into said additional groove, for removing solidified material from the valve.

* * * * *